UNITED STATES PATENT OFFICE.

JOHN S. MAC ARTHUR, OF POLLOKSHIELDS, COUNTY OF RENFREW, SCOTLAND.

PROCESS OF EXTRACTING PRECIOUS METALS FROM THEIR ORES.

SPECIFICATION forming part of Letters Patent No. 411,047, dated September 17, 1889.

Application filed December 13, 1887. Serial No. 257,801. (No model.)

*To all whom it may concern:*

Be it known that I, JOHN STEWART MAC ARTHUR, a subject of the Queen of Great Britain and Ireland, and a resident of Pollokshields, in the county of Renfrew, Scotland, have invented certain Improvements in the Process of Extracting Precious Metals from their Ores, of which the following is a specification.

My invention consists of an improved process of treating ores to extract precious metals therefrom, more particularly gold from gold-bearing ores, without the use of mercury and without roasting, so that a saving of fuel and of furnaces is effected.

The chief feature of my invention consists in the use of perbromide of iron for the extraction of precious metals from their ores.

In carrying out my invention—for the extraction of gold, for instance, from gold-bearing ores—it is first necessary to have the ore free or nearly free from silver, copper, lead, and zinc. If the ore is naturally free or nearly free from these metals, I proceed at once with the treatment of the ore to extract the gold. For this purpose the ore must first be in a powdered condition, and then I add a solution of perbromide of iron to the powdered ore without any preparatory chemical treatment. The solution of perbromide of iron dissolves the gold from the ore. This action may be much facilitated by the application of heat to the solution. A temperature which will give good results is that at which the solution boils, and the solution may be under pressure in a closed vessel, if necessary. When the ore contains silver, copper, lead, or zinc in appreciable quantity, I first treat the ore with a solution of a ferric salt (such as perchloride or persulphate) to remove these metals, as has been heretofore done. The ore thus freed from these substances is then treated with perbromide of iron, as already described. The gold may be recovered from the solution of perbromide of iron by filtration through charcoal or coke. The solution of perbromide may be used several times over; but by repeated use it gradually becomes converted into protobromide of iron. This may be reconverted into perbromide by the addition of bromine or other well-known means.

By the use of perbromide of iron for the treatment of gold-bearing ores in the manner described the gold may be extracted without the use of mercury and without roasting, thus effecting a saving of fuel and of furnaces.

I do not desire to claim exclusively or to restrict myself in all cases to the use of ferric salts for the separation of silver, copper, lead, or zinc from ores containing those metals; nor do I desire to claim or restrict myself to the use of any special means for the reconversion of protobromide of iron into perbromide of iron; but

I claim as my invention—

1. The mode herein described of extracting gold from its ores, which consists in dissolving the gold out of the ore by treating the latter to the action of perbromide of iron, substantially as set forth.

2. The mode herein set forth of extracting gold from its ores by first removing the silver, copper, lead, and zinc by means of ferric salts, and then subjecting the ore thus freed from these metals to the action of perbromide of iron, all substantially as described.

In testimony whereof I have signed my name to this specification in the presence of two subscribing witnesses.

JOHN S. MAC ARTHUR.

Witnesses:
EDMUND HUNT,
DAVID FERGUSON.